United States Patent Office 3,424,216
Patented Jan. 28, 1969

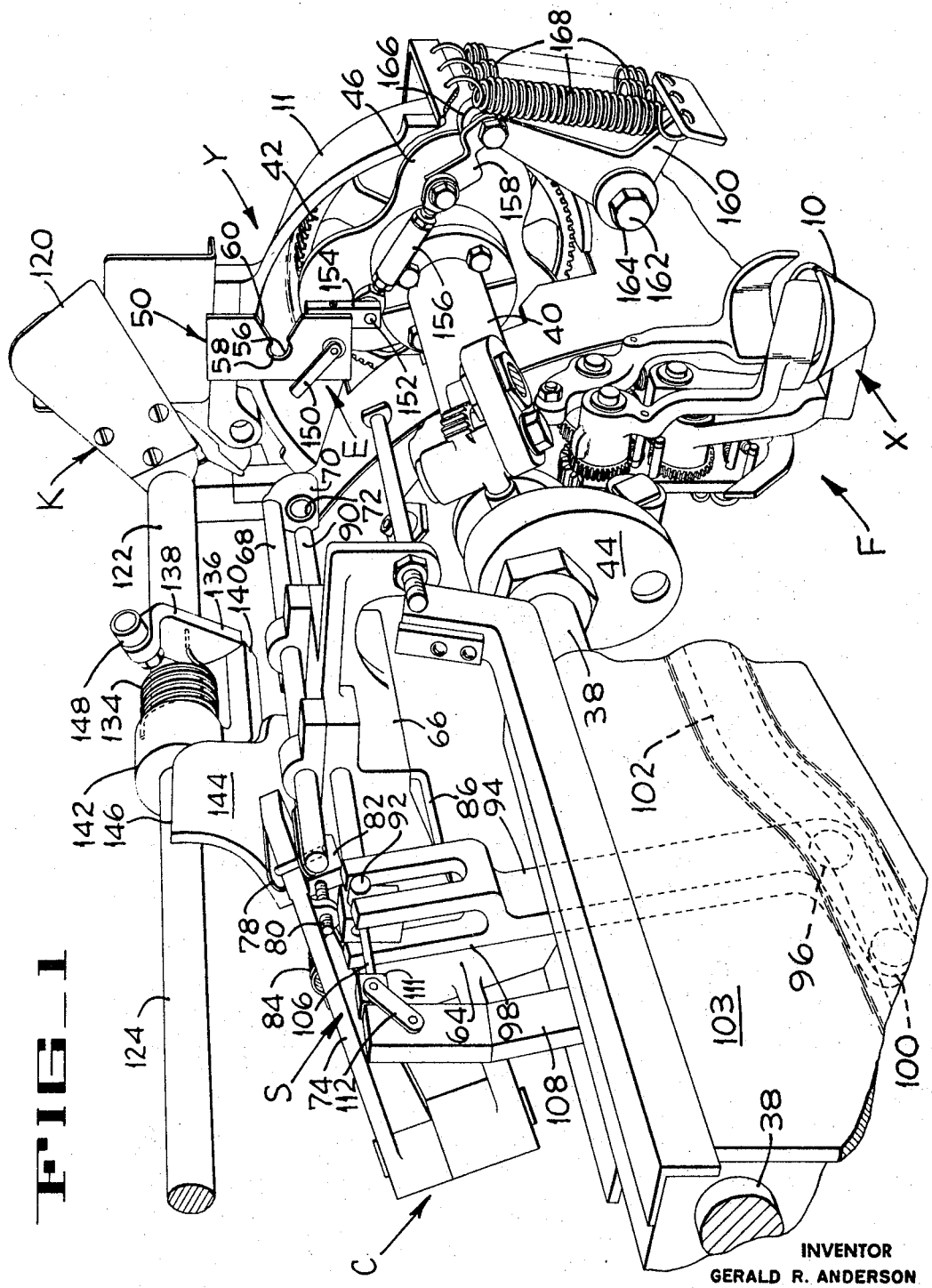

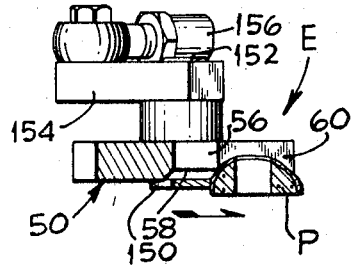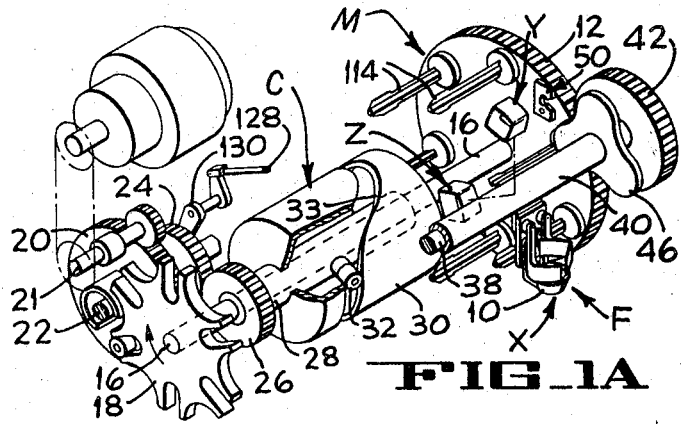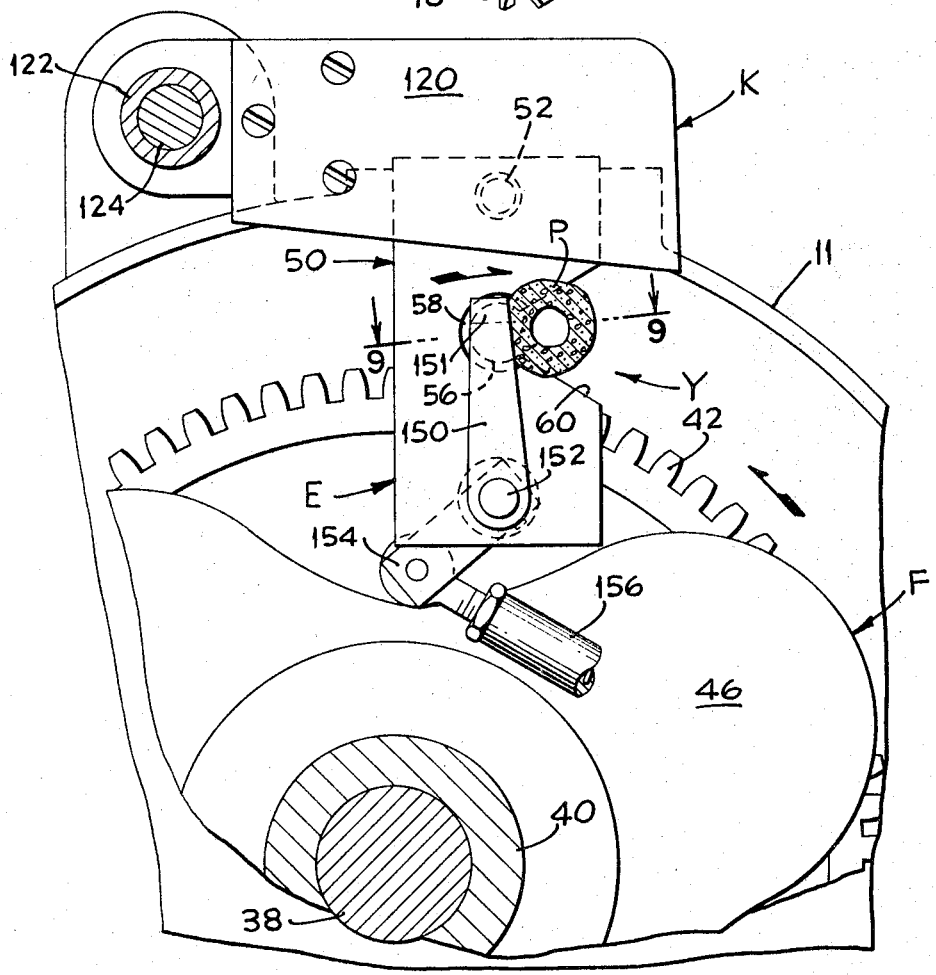

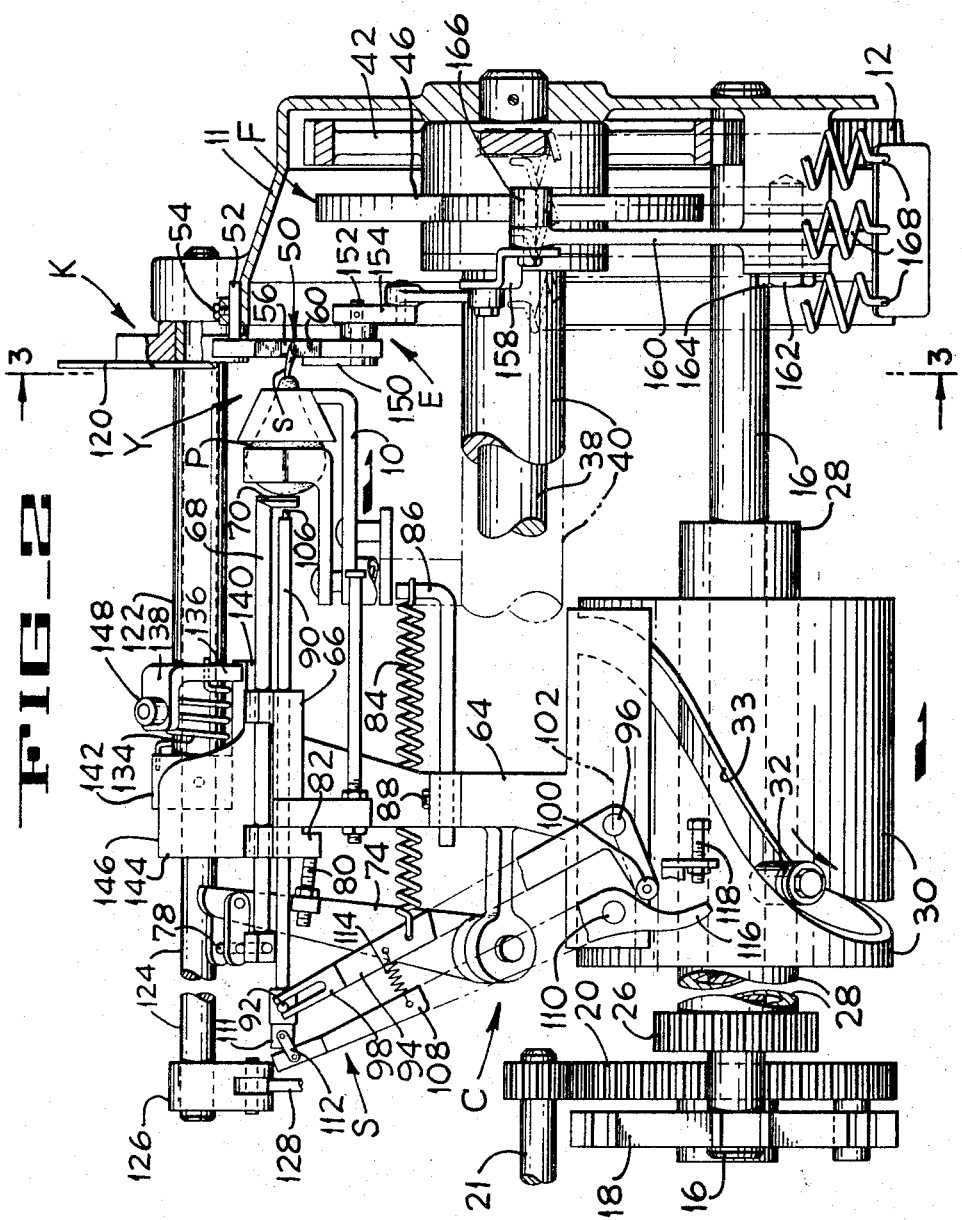

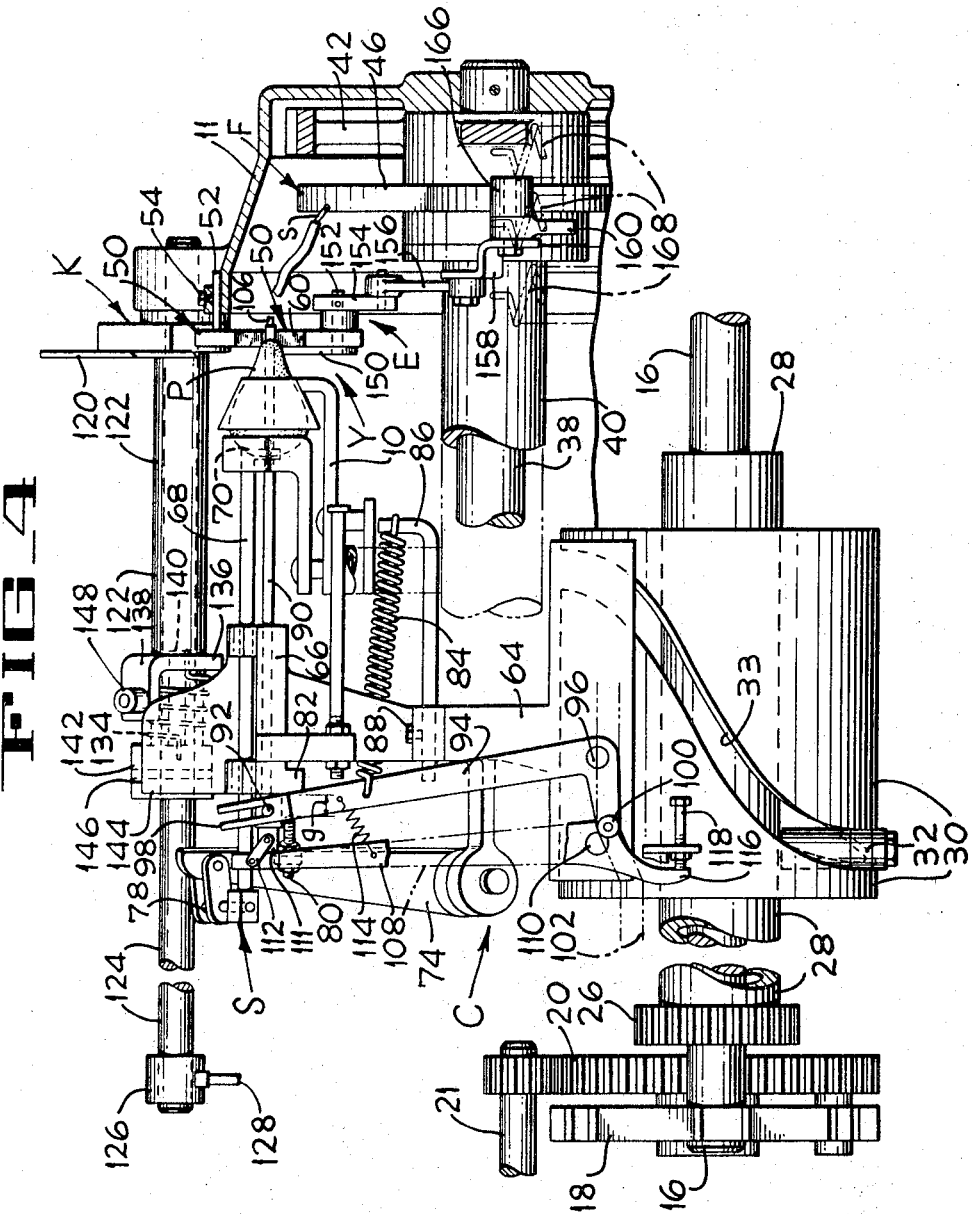

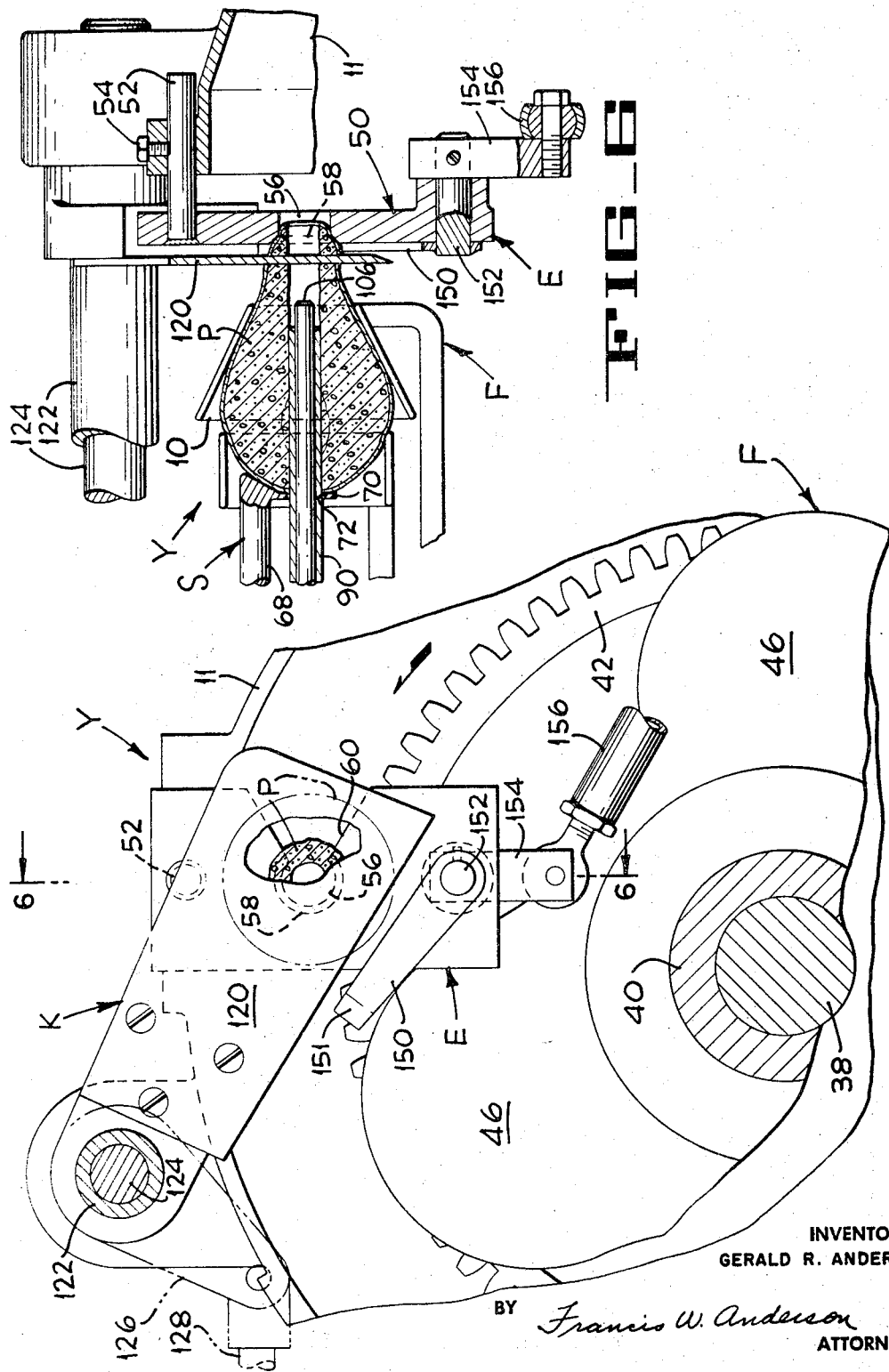

3,424,216
CUT END EJECTOR
Gerald R. Anderson, Campbell, Calif., assignor to FMC Corporation, San Jose, Calif., a corporation of Delaware
Filed Aug. 24, 1966, Ser. No. 574,784
U.S. Cl. 146—81     2 Claims
Int. Cl. A01d 23/04; A23n 15/04; B23q 15/02

ABSTRACT OF THE DISCLOSURE

In a pear machine, a severed fruit-end ejector arm is swung across the fruit receiving face of the gauge plate by a multilobed cam on the feed turret shaft.

---

This invention relates to fruit preparation machines, and more particularly to an improvement in the fruit-end cutter mechanism of such machines which include a cut end ejector.

The best mode contemplated for carrying out the invention will be described in connection with a pear processing machine which automatically removes the cylinder of material from the blossom-stem axis of pears, cuts off the stem end, peels, splits, cores and trims a succession of pears. Machines of this type are manufactured by applicant's assignee under the designation of Model 6L Pear Machine, and include a feed turret having pear receiving cups and associated carriage mounted tools for removing the stem and cutting off the stem end of the fruit. The fruit, thus initially prepared, is then transferred to a main turret for peeling, splitting, coring and trimming.

The present invention relates to operations performed at the feed turret, namely seating of a pear, the insertion of a stemming tube through the pear, for severing the hardened axis material and stem from the pear, ejecting this material from the tube and cutting the stem end off the pear. A pear seater, stemming tube and end cutting knife assembly like that in the apparatus embodying the present invention are disclosed and claimed in the patent to Anderson et al. 3,111,972, assigned to the FMC Corporation. It is the action of the seating and stemming tube apparatus preceding the stem end cutter action which presents the problem solved by the present invention.

Briefly, and as will be seen in the aforesaid Anderson et al. patent, the operation with which this invention is concerned takes place at the first work (stemming) station of the feed turret. A stem end gauge plate having an aperature for receiving the stemming tube is mounted at this station. The pear is presented to the gauge plate in axial alignment with the aperture therein by indexed rotation of the feed turret. A fruit seating shoe is slidably supported on a carriage and the shoe is brought into engagement with a pear, pressing the stem end of the pear against the gauge plate with the pear end projecting into the aperture in the plate. Continued motion of the carriage increases the seating force on the pear, thereby forcing the stem end of the pear further into the aperture in the gauge plate. The stemming tube is now moved axially along the blossom-stem axis of the pear to sever and eject the axis material, including the stem, from the pear. The stemming tube is retracted (along with a telescoped ejector rod) and a cutting knife swings down across the face of the gauge plate for severing the stem end of the pear (seated in the gauge plate aperture) from the body of the pear.

In the apparatus described, a spring mechanism finally urges the fruit seating shoe against the blossom end of the pear and thence presses the stem end against the gauge plate. The apparatus must accommodate a range of axial pear dimensions. With this requirement, the maximum spring pressure applied to the pears occurs on the longest pears, but this pressure can be held to a minimum by causing the feed turret to bring the pear up in front of the gauge plate with the stem end thereof as close to the plate as possible. In order to eliminate possible interference by the stems attached to the pear, the plate is slotted to accommodate the stems as they are carried into the aperture in the plate.

When the pear seating shoe is pressed against the pear, the stem end of the pear is squashed or mashed somewhat, and after severing often remains in place in the aperture in the plate. This would interfere with the next operation at the plate. In the Australian patent to Anderson 2,033,697 accepted June 1, 1961, and assigned to the FMC Corporation, an attempt was made to remove the severed end by a wiper blade mechanism that rotated with the feed turret indexing shaft. This system required that the entry slot referred to above be continued through the gauge plate to form an exit slot for the severed pear end, in order that the rotating wiper blades could eject the severed end from the gauge plate. Difficulties were encountered with this machine because interruption of the wall of the aperture in the gauge plate that receives the stem end of the pear in order to provide both an exit and an entry slot unacceptably reduced the area of the remaining wall available for supporting the pear against the spring pressure applied by the pear seating shoe. The result was an erratic and unsatisfactory operation.

In accordance with the present invention, automatic ejection of the severed stem end of the pear is attained while providing adequate seating area around the rim of the aperture in the gauge plate. This is provided by using the stem entry slot to the aperture as the exit slot for the severed pear end. Linkage mechanism is provided that is operable upon indexing of the feed turret to cause a reverse motion of a single wiper arm pivotally mounted at the gauge plate, for ejecting the severed end of the pear in a direction opposite to that by which it entered the slot in the gauge plate.

Another feature of the ejector mechanism of the present invention is that it can be installed on existing pear machines of the type described, without substantial modification. Use is made of a bell crank inertia-compensating mechanism installed on these machines for improving the smoothness of operation of the machines.

Other advantages are those of readily setting the proper timing cycle of the ejector arm relative to the severing knife, and of facilitating adjustment of arm position.

The preferred embodiment of the invention summarized briefly above will now be described in more detail, in connection with the accompanying drawings.

In the drawings:

FIGURE 1 is a perspective of a portion of a pear machine embodying the invention.

FIGURE 1A is a diagrammatic prospective of drive elements of the machine.

FIGURE 2 is a diagrammatic side elevation of the machine before the carriage is fully advanced.

FIGURE 4 is an elevation like that of FIGURE 2 with a carriage fully advanced.

FIGURE 5 is an enlarged view like that of FIGURE 3 with the knife having completed its severing stroke.

FIGURE 6 is taken on line 6—6 of FIGURE 5.

Figure 7:
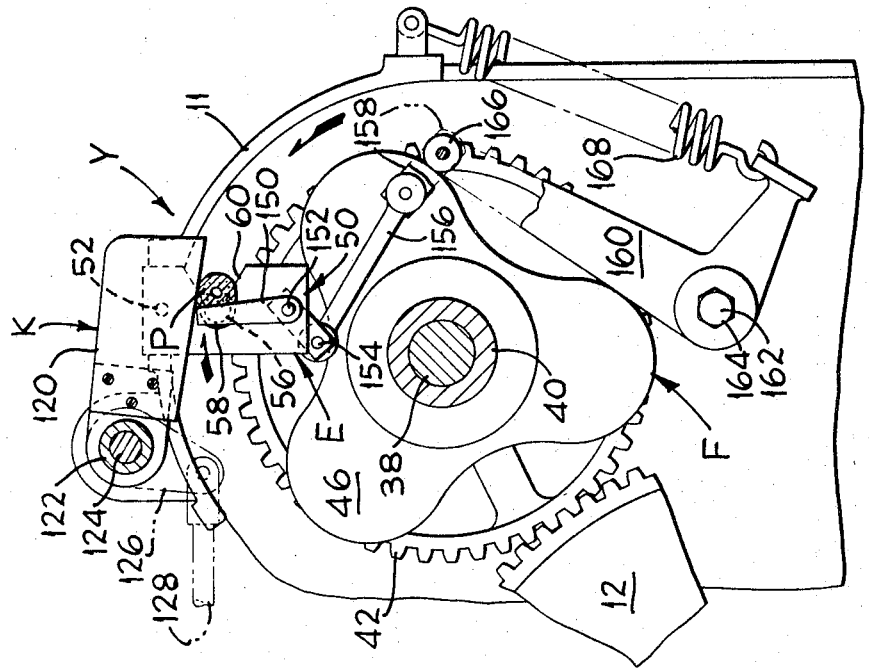
Figure 3:
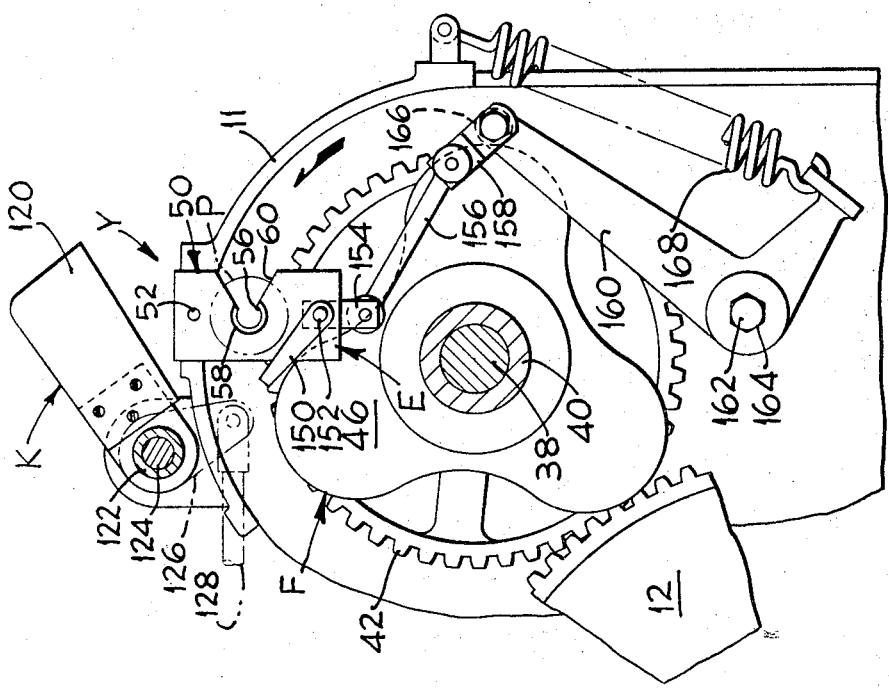
FIGURE 3 is a view taken on lines 3—3 of FIGURE 2.

FIGURE 7 (which appears on the same sheet as FIGURE 3) is a view like FIGURE 3 showing the ejector blade at approximately the mid-position of its ejection stroke.

FIGURE 8 is a fragmentary enlarged view like FIGURE 7.

FIGURE 9 is a section taken on line 9—9 of FIGURE 8.

*General description*

Those features of a pear preparation machine embodying the present invention necessary to an understanding of the invention will be described briefly. Reference is now made principally to FIGURES 1, 1A (on the sheet with FIGURES 8 and 9) and FIGURES 2, 3 and 4. The pears are introduced into the machine via a feed turret indicated generally at F. This turret mounts three special cups 10 disposed at work stations X, Y and Z. A pear is introduced into the cup 10 at a loading station X, and the feed turret F is indexed one-third turn to bring the pear to a work station Y. Simultaneously, with the indexing of the feed turret F a main turret M is indexed one-sixth turn for further processing of the pears.

The work station Y is the station with which the present invention is associated. At this station, a reciprocating carriage C advances and operates a stemming assembly S (FIG. 4) to insert a stemming tube along the axis of the pears to eject the hardened central core as well as the stem. After this, a knife assembly K (FIGURES 1 and 5) operates to trim the stem end of the pear. The ejector mechanism is indicated at E (FIGURES 1, 3, 7 and 8) and operates to eject the trimmed end of the pear from a gauge plate which has been mentioned previously and which will be described in detail presently.

The next 120 degree indexing motion of the feed turret F springs the pierced, stemmed and trimmed pear to a work station Z (FIGURE 1A), which serves as a transfer station for placing the pear onto one of six carriers mounted on the main turret M. The operations performed upon pears on the main turret M are not critical to the present invention and are explained in detail in connection with a pear machine of the type herein illustrated in the patents to Creed et al. 2,984,274 and Freeman et al. 2,905,216, both assigned to the FMC Corporation.

Many of the machine elements referred to above are known, and in fact, tools mounted on the carriage C (FIGURE 1) and closely associated with the action of the present invention are described in detail and claimed in the patent to Anderson et al. 3,111,972, also assigned to the FMC Corporation. However, an expanded description of certain of these elements follows, as an aid to and understanding of the present invention and how it relates to the overall pear preparation apparatus in which the invention is embodied.

*Main turret drive*

As mentioned, the main turret M is indexed one-sixth turn for each cycle. This brings pears to various stations for peeling, splitting, coring and trimming operations not critical to the present invention. The frame of the apparatus is indicated generally at 11 and mounts a main turret drive gear 12, from which projects six fruit mounting rods or stemming tubes 14. These are illustrated schematically in FIGURE 1A and are explained in detail in the aforesaid Creed et al. and Freeman et al. patents.

The main turret gear 12 is turned intermittently by a turret shaft 16 (FIGURE 1A) which is indexed one-sixth turn by a Geneva gear 18 and a driver gear 20, the latter being rotated continuously during operation. Continuous rotation is provided by a motor driven counter shaft 21. Thus, although the Geneva driver gear 20 rotates continuously, the main turret gear 12 of the main turret M is indexed in increments of 60 degrees for positioning pears on the stemming tubes 14 at the various work stations disposed around the main turret, but not illustrated in the drawings.

*Carriage drive*

The carriage, indicated generally at C in FIGURE 1, carries several tools and reciprocates continuously along the pear axis, the reciprocating motion being taken from the continuous drive previously mentioned. In FIGURE 1A all of the carriage except a barrel cam that causes carriage reciprocation has been omitted for clarity.

In order to reciprocate the carriage C, a jack shaft 22, which mounts the Geneva driving gear 20, also mounts a carriage drive gear 24, and hence gear 24 rotates continuously. The gear 24 is meshed with a gear 26 of equal size fixed to a sleeve 28 that rotates independently on the turret indexing shaft 16. The carriage C is mounted upon and includes a barrel cam 30 that is slidable along the continuously rotating sleeve 28. Reciprocation of the cam 30, and the carriage attached thereto, is actually caused by a roller 32 mounted on the sleeve 28 and riding in a helical cam slot 33, FIGURES 1A and 2. The timing of the Geneva drive and the barrel cam 30 is such that the turrets F and M are stationary when the carriage is moving in its advanced position for operating upon a pear at the work station Y. Indexing of the two turrets occurs only after the barrel cam 30 has retracted the carriage sufficiently to preclude interference between the parts carried by the turrets and parts mounted on the carriage.

*Feed turret drive*

As mentioned, the feed turret F carrying the three fruit cups 10 is indexed simultaneously with the indexing of the main turret M, but through twice the angle. This makes it possible to provide the loading station X, the work station Y and the transfer station Z of the feed turret in synchronism with the operation of a six station main turret. The feed turret F rotates on a fixed shaft 38 extending lengthwise of the machine and mounted in the frame 11. The turret itself is mounted on a sleeve 40 rotatably mounted on a fixed shaft 38 and driven at double the main turret speed by a gear 42 meshed with the main turret gear 12. This provides one-third of a revolution of the feed turret for one-sixth of a revolution of the main turret.

The pear supporting and transport cups 10 at stations X, Y and Z are mounted by brackets on the sleeve 40, and are opened and closed by means including a cam 44 (FIG. 1). These details are not critical to the present invention but are explained in detail in the aforesaid Freeman et al. Patent 2,905,216. In FIGURE 1, a cup 10 is shown at the loading station X in a position ready to receive a pear therein. The cup 10 which would actually be at the work station Y has been removed in FIGURE 1, in order to more clearly illustrate the apparatus critical to the present invention. In FIGURE 2, which is a diagrammatic view, the feed cup 10 at the work station Y is shown in highly simplified form. In FIGURE 1A which is a diagrammatic perspective, a cup is indicated schematically at work station Y as well as at work station Z, whereas the cup at the loading station X is drawn somewhat more accurately.

In order to serve as an inertia compensator and to operate the pear-end reject of the present invention, a three lobed cam 46 is mounted for rotation with the sleeve 40 of the feed turret F. The reject mechanism associated with this cam will be best understood after completion of the general description of the features of the machine that follows.

*Gauge plate*

A guage plate 50 is provided to gauge the position of a pear relative to the cutting knife for severing the pear-end, as well as for backing up the pear during the removal of the stem along with a length of axially disposed, relatively hard core material.

The guage plate 50 is mounted at the feed turret station Y by means of a rod 52, which slides through a bore in the frame 10 and can be clamped in an adjusted position by means of a setscrew 54. The gauge plate is formed with a stem-end aperture 56 having a beveled wall portion 58 with a circumference of more than three-quarters of a circle. The wall of the aperture 56 is interrupted by a slot 60, FIGURES 3 and 8, for accommodating the stem of the pear as the latter is brought into position at the work station Y during indexing of the feed turret. The slot 60 also accommodates ejection of the trimmed end of the pear by the apparatus of the present invention. The cooperation of the gauge plate in the apparatus of the present invention will be described in more detail after other salient features of the pear apparatus embodying the invention are described.

*Fruit seater*

As previously mentioned, a resiliently loaded fruit seater structure is provided for urging the pear against the gauge plate 50. Although this mechanism is like that described and claimed in the aforesaid Anderson et al. Patent 3,111,972, since, the operation of the fruit seater relates to the present invention, the more salient features of the fruit seater will be briefly described.

Referring principally to FIGURES 1, 2 and 4, the carriage C includes a superstructure indicated generally at 64 for mounting the fruit seater and other tools. At the upper portion of the carriage portion 64 is a bearing block 66 which slidably receives a fruit seater rod 68, the end of which mounts a fruit seater shoe 70. As seen in FIGURE 1, the shoe 70 is apertured at 72 for receiving a stem removing tube to be described presently. The fruit seater shoe 70 reciprocates back and forth with the carriage C but means are provided for causing the shoe to resiliently press a pear against the gauge plate at the work station Y, near the end of the carriage advance stroke, while the carriage completes its advance stroke.

The fruit seating function is provided by mechanism including a shoe presser lever 74. The upper end of the lever 74 is connected by linkage 78 to the fruit seater rod 68. An adjustable screw stop 80 projects from the lever 74 and normally engages a carriage abutment 82, and a spring 84 is connected between the lever 74 and a spring post 86 adjustably mounted on the carriage by means of a set screw 88, as best seen in FIGURE 2.

In the position of the parts shown in the diagram of FIGURE 2, the stop screw 80 is brought into abutment with the carriage portion 82 by the spring 84 because the fruit seater shoe 70 has not yet reached a pear P in the cup at the work station Y. In the position of the parts shown in the diagram of FIGURE 4, the carriage C has reached its fully advanced position, with the fruit seater shoe pressing the pear P against the gauge plate 50. The final advance of the carriage C has moved the carriage ahead of the condition not shown but explained in the aforesaid Anderson et al. patent, wherein the shoe 70 first engages the blossom end of the pear. Continued motion of the carriage C past the latter position has left the fruit seater shoe and the lever 74 behind, so that the carriage abutment portion 82 has moved on away from the abutment screw 80 on the lever, thereby providing a gap *g* between the lever abutment screw and the carriage. This permits the force of the spring 84 to press the shoe 70 against the pear and firmly seat the stem end of the pear in the aperture 56 in the gauge plate.

*Stemming tube assembly*

The stemming tube assembly removes a core of pear material along the blossom-stem axis, along with the stem itself, and insures that the core thus removed will be freed from the operating zone of the work station Y. This assembly is also described in more detail in the aforesaid Anderson et al. patent and will be reviewed here only briefly.

A stemming tube 90 is slidably mounted in the guide block 66 on the carriage and has a sharpened end for piercing the pear. The other end is formed with a trunnion 92 operated by a bell crank lever 94 pivoted to the carriage at 96. The bell crank is forked at 98 to operate the stemming tube trunnion. The lower end of the bell crank is provided with a roller 100 riding in a slot 102 formed in a fixed cam 103. This cam has been broken away in FIGURE 2 but the cam slot 102 is shown in broken lines. The cam slot is on the inner surface of the cam 103 as shown in dotted lines in FIGURE 1. The cam 103 is clamped to the fixed shaft 38 previously mentioned as supporting the sleeve 40 for the feed turret F. The purpose of the cam 103 is to give the stemming tube 90 an independent advance motion after the stemming tube has been brought to the pear.

The stemming tube lever 94 normally advances with the carriage C because of the pivotal connection at 96, although the cam 100 and its slot 102 cause an independent advance of the lever and the connected stemming tube, during the terminal portion of the carriage advance stroke, in order to pierce the pear.

An ejector rod 106 is telescoped within the stemming tube 90 in order to eject the core of material cut out by the tube. The mounting of this rod resembles that of the stemming tube in that it normally moves with the carriage but has a lever 108 connected thereto to provide independent positive advance motion near the end of the carriage advance. The lever 108 is pivoted on the carriage portion 64 at 110 and connected to a trunnon 111 at the end of the ejector rod by linkage 112. The ejector rod lever 108 is connected to the stemming tube lever 94 by a spring 114 which urges the trunnion 111 against the trunnion 92 and which results in joint motion of the stemming tube and ejector rod during most of the carriage reciprocation. In order to provide final relative advance of the ejector rod to eject the core, the rod 108 has an extension 116 projecting down from the pivot 110 and this extension is brought into engagement with a fixed abutment screw 118 mounted on the machine frame. When the extension arm 116 on the ejector rod lever is brought into engagement with the abutment screw 118, further motion advance of the carriage C toward the pear causes an accelerated motion of the ejector rod to eject the core which has been cut and retained in the stemming tube 90, all as explained in detail in the aforesaid Anderson et al. Patent 3,111,972.

*Knife assembly*

As mentioned, the knife assembly K is provided in order to cut off the stem end of the pear and it is the ejection of the severed stem end from the gauge plate which presents the problem solved by the ejector mechanism E of the present invention. After the stemming tube 90 has pierced the pear, the cut out core has been ejected by the ejector rod 106 and both tube and rod retracted from the pear, the knife assembly acts to rapidly sever the stem end of the pear. The knife assembly is operated by the continuously rotating portions of the apparatus, but the timing is such that the knife descends only when the stemming tube has been retracted and while the feed turrent F is still in its stationary position with the pear to be trimmed held pressed against the gauge plate 50 by the pear seating shoe 70.

The knife assembly includes a blade 120 mounted by means of a hub to a sleeve 122 that is independently rotatable on a knife rotating shaft 124. The shaft 124 is oscillated by a crank 126, a link 128 and by mechanism operated by a continuously driven gear, the details of which are not critical to the present invention. The aforesaid patents to Anderson et al. and Creed et al. explain the details of a preferred knife construction and these will only be mentioned briefly. Referring to FIGURE 1A, the link 128 for operating the knife is oscillated by a crank assembly 130 and an internal cam slot (not shown) formed on the continuously rotating gear 24. This cam is shaped and positioned to cause the knife timing cycle to be synchronized with the motion of the carriage and the indexing of the feed turrent F. in the manner described.

The knife is actually caused to descend and sever the pear end by means of a quick acting spring and release cam assembly. The knife sleeve 122 is coupled to the knife operating shaft 124 by a coil spring 134. This spring urges the sleeve 122 to rotate on the shaft 124 in a direction to press a lug 136 projecting from a bracket 138 fastened to the sleeve 122, against the finger 144 projecting from a collar 142. The collar 142 is pinned to the oscillating knife operating shaft 124. The quick release action is obtained by means of a cam 144 having a knife hold-back portion 146 against which a roller 148 on the bracket 138 is urged by the coil spring 134 during the time that the carriage is advanced sufficiently to place the stemming tube 90 and the ejector rod 106 in the path of the knife.

*Ejector mechanism*

The ejector mechanism includes a blade 150 that moves quickly across the gauge plate 50 after the knife has cut off the pear-end and has been partially retracted to clear the blade. As previously mentioned, this permits provision of an ample bearing area for supporting the pear against the force of the spring 84 connected to the pear seater lever 74, as seen in FIGURE 4. The ejector blade or lever 150 is pivotally mounted to slide across the face of the gauge plate 50. The outer end face of the blade is beveled at 151 to insure that the knife will clear the upper portion of the lever before the knife is fully retracted. The lower end of the ejector blade 150 (FIGS. 2 and 3) is connected to a shaft 152 that projects through a bore in the gauge plate 50 and terminates in a crank 154 pinned to the shaft. The lower end of the crank 154 is pinned to a link 156. This link may be formed of a screw and turnbuckle assembly (FIG. 1) for adjusting the position of the blade 1. The link 156 is shown in diagrammatic form in FIGURES 2, 3, 4 and 7. The lower end of the link 156 is pivoted to a bracket 158 that is fixed to the upper end of a bell crank 160. The bell crank 160 is pivotally mounted on the frame at 162 and a bolt 164 that fixes the bracket 158 to the upper end of the bell crank 160 also mounts a roller 166 that rides on the three lobed cam 46, previously mentioned as part of the feed turret mechanism.

A plurality of coil springs 168 connect between the lower arm of the bell crank lever 160 and the frame 10, as seen in FIGURES 1 and 3. These springs are relatively strong and the position of the three lobed cam 46 on the feed turret F is selected so that the force of the springs tends to smooth out the acceleration and deceleration forces caused by the cups on the feed turret, during indexing. This same action of the bell crank 160 and the springs 168 also causes a motion of the ejector blade 150 in a direction contrary to the direction of rotation of the feed turret during the indexing cycle, to eject the end portion of the pear trimmed off of the pear body by the knife assembly K, from the gauge plate 50.

*Operation*

In the following brief description of the operation of the invention, only the features of the pear machine that bear closely on the invention will be explained in any detail. The side elevation of FIGURE 2 and the end section of FIGURE 3 are diagrams showing the positions at the work station Y when the carriage C is near, but has not reached the end of its advance stroke. The feed turret F will have indexed to bring a cup to the work station Y, and a pear P (FIGURE 2) will be in the cup held in front of and aligned with the aperture 56 in the gauge plate 50. The pear is not shown in FIGURE 3 for clarity. As the pear is brought up to and positioned in front of the gauge plate 10, a long stem s, FIGURE 2, attached to the pear will slide through the slot 60 and into the aperture 56. During this indexing the knife 120 will be lifted clear of the gauge plate 50 and the ejector arm 150 will be moving away from the aperture 56 in the gauge plates (to the left in FIGURE 3), to avoid interference with the approaching pear. The timing of the barrel cam 30 operating the carriage C is such that during indexing, the carriage will be approaching the gauge plate and the pear.

At the carriage position of FIGURE 2, the pear seater shoe 70, the stemming tube 90 and the ejector rod 160 are all in their normal position and are moving with the carriage towards the pear.

In FIGURE 4, the feed turret F remains in its previous position and further motion of the carriage has left the seating shoe against the pear. This has opened up a small gap g between the stop 80 on the seating shoe lever 74, and the abutment 82 on the carriage. Thus, the spring 84 presses the pear seater shoe 70 against the blossom end of the pear and hence firmly seats the stem end of the pear in the aperture 56 in the gauge plate It is this pressure seating of the pear which makes necessary the ejector apparatus of the present invention. At this point it is noted that the spring 84 and its adjustable post 86 must be selected and adjusted to provide the proper seating pressure against the pear over a range of lengths. Thus if the spring 84 is adjusted to properly seat axially short pears, the spring will press the shoe 70 against long pears with more force. This causes deformation of the stem end of the pear and causing that end to be seated quite firmly in the gauge plate aperture 56, after the end has been severed from the body of the pear.

The completed stemming and core ejection operations are also shown in FIGURE 4. The cam slot 102 in the fixed cam 103 has forced the stemming tube 90 to fully advance and cut a core out of the pear, along with the stem. The engagement of the arm 116 on the ejector rod lever 108 with the fixed stop screw 118 has caused positive advance of the ejector rod 106 through the stemming tube 90, to eject the core and the attached stem s, as seen at the right of the gauge plate in FIGURE 4. The intermediate motions of this assembly are explained in more detail in the aforesaid patent to Anderson et al. 3,111,972.

As to the knife assembly and referring back to FIGURE 2, it will be noted that the knife 120 has been raised by the knife operating crank 126 and the shaft 124. In FIGURE 4 the shaft 124 has been moved to a new position, bringing in the finger 140 on the shaft collar 142 clear of the projection 146 on the knife sleeve bracket 138. However, the spring 134 cannot cause the knife to descend and cut the pear at this time, because the upper surface 146 on the carriage cam 144 has been advanced under the roller 148 on the knife bracket, and thereby restrains motion of the knife against the force of the coil spring 134. This is the condition that exists in FIGURE 4, before the stemming tube and ejector rod have been retracted.

In FIGURES 5 and 6, which are enlarged views, the feed turret F remains stationary, but the carriage (not seen) has partially retracted, to retract the stemming tube and ejector rod. The cam 144 on the carriage has been brought out from under the roller 148, thereby freeing the knife for rapid descent under the force of the spring 134. The finger 140, as seen in FIGURE 4, has been retracted by the knife operating mechanism to clear the lug 136 and permit the knife to descend. The knife is shown in its lowermost position in FIGURES 5 and 6 having cut or trimmed off the stem end of the pear and the knife clears the ejector blade 150, as seen in FIGURE 5. The severed end of the pear is best seen in FIGURE 6. It often becomes firmly wedged in the aperture 56 in the gauge plate, due to the force of the pear seating spring 84 (FIGURE 4). This is particularly true when long pears are being processed.

FIGURE 7, which is on the same sheet with FIGURE 3, as well as the enlarged view of FIGURE 8, shows the feed turret being indexed and illustrates an intermediate stage in the ejection of the severed end of the pear. Here the Geneva mechanism is indexing the feed turret F by means of the gear 42. The three lobed cam 46 has turned to bring a low portion of a lobe under the roller 166 on the spring loaded bell crank 160. As indicated by the arrows in FIGURES 7 and 8 this cam motion causes the ejector blade 150 to pivot counterclockwise or to the right, and as seen in the fragmentary section of FIGURE 9 the blade 150 strikes the severed pear-end and forces it clear of the aperture 56 in the gauge plate. The combined entry and exit slot 60 in the gauge plate rapidly relieves the confining force on the severed end portion of the pear and also permits ejection and final propulsion of the severed end portion clear of the working zone.

The knife assembly K will now be in that portion of the cycle wherein the knife 120 is being lifted, and it will have been lifted sufficiently to clear the end of the ejector blade 150. If there is any slight overlap of these parts, the beveled end portion 151 of the blade 150 will prevent actual contact with the knife. The action of the three lobed cam and the ejector blade not only assures perfect synchronism of the parts with the indexing of the feed turret but also provides a relatively rapid ejection stroke of the blade. The ejector mechanism is quite simple and can be readily added to the apparatus for use with fruit which requires ejection of the cut ends of the fruit. The adjustable link 156 is readily accessible, as can be seen in FIGURE 1. This, coupled with the accessibility of the pin connections, and particularly the connection between the crank 154 and the shaft 152 for the wiper blade 150, facilitates installation, adjustment and maintenance of this portion of the machine.

Having completed a detailed description of the invention so that those skilled in the art may practice the same I claim:

1. Fruit end cutting apparatus of the type comprising a frame, a fruit-end gauge plate on said frame, a fruit-end receiving aperture in said plate, a stem entrance slot in said plate leading to said aperture and forming the sole interruption to the wall around the aperture, an indexed feed cup turret having means for bringing fruit to said gauge plate aperture, and a knife mounted for motion across said gauge plate; the improvement wherein said gauge plate is normally stationary in said frame, said knife is spaced from said gauge plate to leave a short projecting portion of the severed fruit end, a fruit-end ejector arm mounted for motion across the fruit receiving face of said gauge plate, and ejector operating means for moving said ejector arm in a direction contrary to the motion of the turret to engage the short projecting portion of severed fruit end and eject it out through said stem entrance slot, during indexing of said turret.

2. The apparatus of claim 1, wherein said ejector operator means comprises a multilobe cam mounted for indexing with said feed cup turret, a linkage between said cam and said ejector arm.

References Cited

UNITED STATES PATENTS

| | | | |
|---|---|---|---|
| 2,910,102 | 10/1959 | Windman et al. | 146—81 |
| 2,963,061 | 12/1960 | Csimma et al. | 146—81 |
| 3,111,972 | 11/1963 | Anderson et al. | 146—81 |

W. GRAYDON ABERCROMBIE, *Primary Examiner.*

U.S. Cl. X.R

146—52